United States Patent
Ji et al.

(10) Patent No.: US 10,437,851 B2
(45) Date of Patent: Oct. 8, 2019

(54) SYNCHRONIZING OBJECT IN LOCAL OBJECT STORAGE NODE

(71) Applicant: International Business Machines Corporation, Armonk, NY (US)

(72) Inventors: Hai Ji, Beijing (CN); Yuan Yuan Li, Beijing (CN); Xiaoyang Yang, Shanghai (CN); Chun Guang Zeng, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 330 days.

(21) Appl. No.: 14/869,579

(22) Filed: Sep. 29, 2015

(65) Prior Publication Data
US 2016/0117376 A1    Apr. 28, 2016

(30) Foreign Application Priority Data
Oct. 28, 2014   (CN) .......................... 2014 1 0589869

(51) Int. Cl.
*G06F 17/30* (2006.01)
*G06F 16/27* (2019.01)

(52) U.S. Cl.
CPC .................... *G06F 16/27* (2019.01)

(58) Field of Classification Search
CPC ......... G06F 17/30575; G06F 17/30867; G06F 17/30368; G06F 16/27
(Continued)

(56) References Cited

U.S. PATENT DOCUMENTS 5,699,388 A * 12/1997 Wang ..................... H04B 7/269
                                                                370/507
6,006,274 A * 12/1999 Hawkins ............... G06F 1/1626
                                                                709/248
(Continued)

FOREIGN PATENT DOCUMENTS

CN    1917449 A    2/2007
CN    1917522 A    2/2007
(Continued)

OTHER PUBLICATIONS

Hupfeld, F., "Log-Structured Storage for Efficient Weakly-Connected Replication," Second International Workshop on Mobile Distributed Computing (MDC 2004). In: Proceedings of the 24th International Conference on Distributed Computing Systems (ICDCS) Workshops, 2004. pp. 1-6. https://static.aminer.org/pdf/PDF/000/298/502/log_structured_storage_for_efficient_weakly_connected_replication.pdf.
(Continued)

*Primary Examiner* — Greta L Robinson
(74) *Attorney, Agent, or Firm* — Brian D. Welle (57) ABSTRACT

A latest status record of an object in a local storage node is obtained as a local status record of the object. The status record includes a name of an operation changing the object, a timestamp of the operation changing the object, a first status flag, and a second status flag. The first status flag indicates whether a synchronization of the object from current object storage node to another object storage node is executed. The second status flag indicates whether a synchronization of the object from another object storage node to the current object storage node is executed. The latest status record of the object is obtained of the object in from a remote object storage node as a remote status record of the
(Continued)

object. A synchronization of the object is executed based on the local status record and the remote status record.

18 Claims, 5 Drawing Sheets

(58) Field of Classification Search
USPC ....... 707/601, 620, 624, 625, 626, 634, 636, 707/637, 638, 639, 648, 649, 652, 656, 707/660, 686, 704
See application file for complete search history.

(56) References Cited

U.S. PATENT DOCUMENTS

| | | | | |
|---|---|---|---|---|
| 6,393,434 | B1* | 5/2002 | Huang | G06F 17/30575 |
| 6,539,381 | B1* | 3/2003 | Prasad | G06F 17/30575 |
| 6,820,098 | B1 | 11/2004 | Ganesh et al. | |
| 7,054,887 | B2 | 5/2006 | Kozina | |
| 7,778,972 | B1 | 8/2010 | Cormie et al. | |
| 7,778,984 | B2 | 8/2010 | Zhang et al. | |
| 7,809,898 | B1 | 10/2010 | Kiselev et al. | |
| 7,814,499 | B2 | 10/2010 | Straube et al. | |
| 9,244,933 | B2* | 1/2016 | Hildebrand | G06F 17/30132 |
| 9,244,993 | B1* | 1/2016 | Adoc, Jr. | H04L 67/1095 |
| 9,607,090 | B2* | 3/2017 | Palmert | G06F 17/30867 |
| 2003/0212681 | A1* | 11/2003 | Kasper, II | G06F 17/30575 |
| 2003/0217152 | A1* | 11/2003 | Kasper, II | G06F 9/526 709/226 |
| 2005/0114431 | A1* | 5/2005 | Singh | G06F 17/30575 709/201 |
| 2005/0267921 | A1 | 12/2005 | Bali et al. | |
| 2006/0155776 | A1* | 7/2006 | Aust | G06F 16/10 |
| 2010/0156710 | A1* | 6/2010 | Wirola | G01S 19/254 342/357.31 |
| 2011/0173294 | A1* | 7/2011 | Jackson | G06F 17/30575 709/217 |
| 2012/0036277 | A1 | 2/2012 | Stokking et al. | |
| 2012/0239617 | A1 | 9/2012 | Savenok et al. | |
| 2012/0303581 | A1 | 11/2012 | Calder et al. | |
| 2014/0108717 | A1 | 4/2014 | Tian et al. | |
| 2014/0195930 | A1* | 7/2014 | Rajagopal | G06F 3/0484 715/753 |
| 2016/0259837 | A1* | 9/2016 | Itoh | G06F 17/30581 |
| 2017/0300391 | A1* | 10/2017 | Namburi | G06F 11/1469 |

FOREIGN PATENT DOCUMENTS

| | | |
|---|---|---|
| CN | 103530362 A | 1/2014 |
| WO | 2010025554 A1 | 3/2010 |

OTHER PUBLICATIONS

Saito et al., "Replication: Optimistic Appraches," hp Technical Report, HPL-2002-33, Feb. 8, 2002, pp. 1-40, @ Copyright Hewlett-Pakard Company 2002. http://www.hpl.hp.com/techreports/2002/HPL-2002-33.pdf?q=optimistic.

CN Application 201410589869.4, entitled "Method and Apparatus for Synchronizing Object in Local Object Storage Node," filed Oct. 28, 2014, 32 pages.

* cited by examiner

SYNCHRONIZING OBJECT IN LOCAL OBJECT STORAGE NODE

BACKGROUND

The present disclosure relates to object storage technology, and more specifically, to a method and an apparatus for synchronizing an object in a local object storage node.

Currently, an object storage system is becoming more and more popular. The object storage system takes an object as a basic unit for storage, and each object is an integration of data and data attribute sets. Typically, the object is stored in an object storage device, and the object storage device is responsible for managing the local objects.

In a distributed object storage system, a plurality of object storage devices can synchronously store the same object, so that there are a plurality of multiple replicas of the object in the plurality of object storage devices.

However, if any object storage device of these object storage devices fails or a network fails, the replicas of the object might only exist in some object storage devices, rather than all the object storage devices. Therefore, it is necessary to repair such inconsistencies in which there is only a part of replicas.

In the prior art, a background replication solution is provided to discover and repair such inconsistencies in which there is only a part of replicas. For example, OpenStack Swift object storage system employs a replicator to perform this solution. In each replication cycle, the replicator retrieves names and timestamps of all the objects in each of the plurality of object storage devices which store multiple replicas of a specific object, finds discrepancies between the replicas of the object in the respective object storage devices by comparing the retrieved data, and further repair the found discrepancies. However, this solution poses high I/O overhead as it needs to scan (read) the file system for the name and timestamp of every object. In addition, if the number of the objects in the object storage device is huge, it would take a lot of time to complete the comparison for all the objects, and thus the performance of the replicator would become intolerable.

SUMMARY

Embodiments of the present disclosure provide a method and an apparatus for synchronizing an object in a local object storage node.

According to one embodiment of the present disclosure, there is provided a method for synchronizing an object in a local object storage node, wherein same object is stored on the local object storage node and a remote object storage node, the method comprising: obtaining the latest status record of the object in the local object storage node as a local status record of the object, the status record including a name of an operation changing the object, a timestamp of the operation changing the object, a first status flag and a second status flag, the first status flag indicating whether a synchronization of the object from current object storage node to another object storage node is executed, the second status flag indicating whether a synchronization of the object from the another object storage node to the current object storage node is executed; obtaining the latest status record of the object in the remote object storage node as a remote status record of the object; and executing synchronization of the object based on the local status record and the remote status record.

According to another embodiment of the present disclosure, there is provided an apparatus for synchronizing an object in a local object storage node, wherein same object is stored on the local object storage node and a remote object storage node, the apparatus comprising: a local status record obtaining module configured to obtain the latest status record of the object in the local object storage node as a local status record of the object, the status record including a name of an operation changing the object, a timestamp of the operation changing the object, a first status flag and a second status flag, the first status flag indicating whether a synchronization of the object from current object storage node to another object storage node is executed, the second status flag indicating whether a synchronization of the object from the another object storage node to the current object storage node is executed; a remote status record obtaining module configured to obtain the latest status record of the object from the remote object storage node as a remote status record of the object; and a synchronizing module configured to execute synchronization of the object based on the local status record and the remote status record.

BRIEF DESCRIPTION OF THE DRAWINGS

Through the more detailed description of some embodiments of the present disclosure in the accompanying drawings, the above and other objects, features and advantages of the present disclosure will become more apparent, wherein the same reference generally refers to the same components in the embodiments of the present disclosure.

DETAILED DESCRIPTION

Some preferable embodiments will be described in more detail with reference to the accompanying drawings, in which the preferable embodiments of the present disclosure have been illustrated. However, the present disclosure can be implemented in various manners, and thus should not be construed to be limited to the embodiments disclosed herein. On the contrary, those embodiments are provided for the thorough and complete understanding of the present disclosure, and completely conveying the scope of the present disclosure to those skilled in the art.

Figure 1:
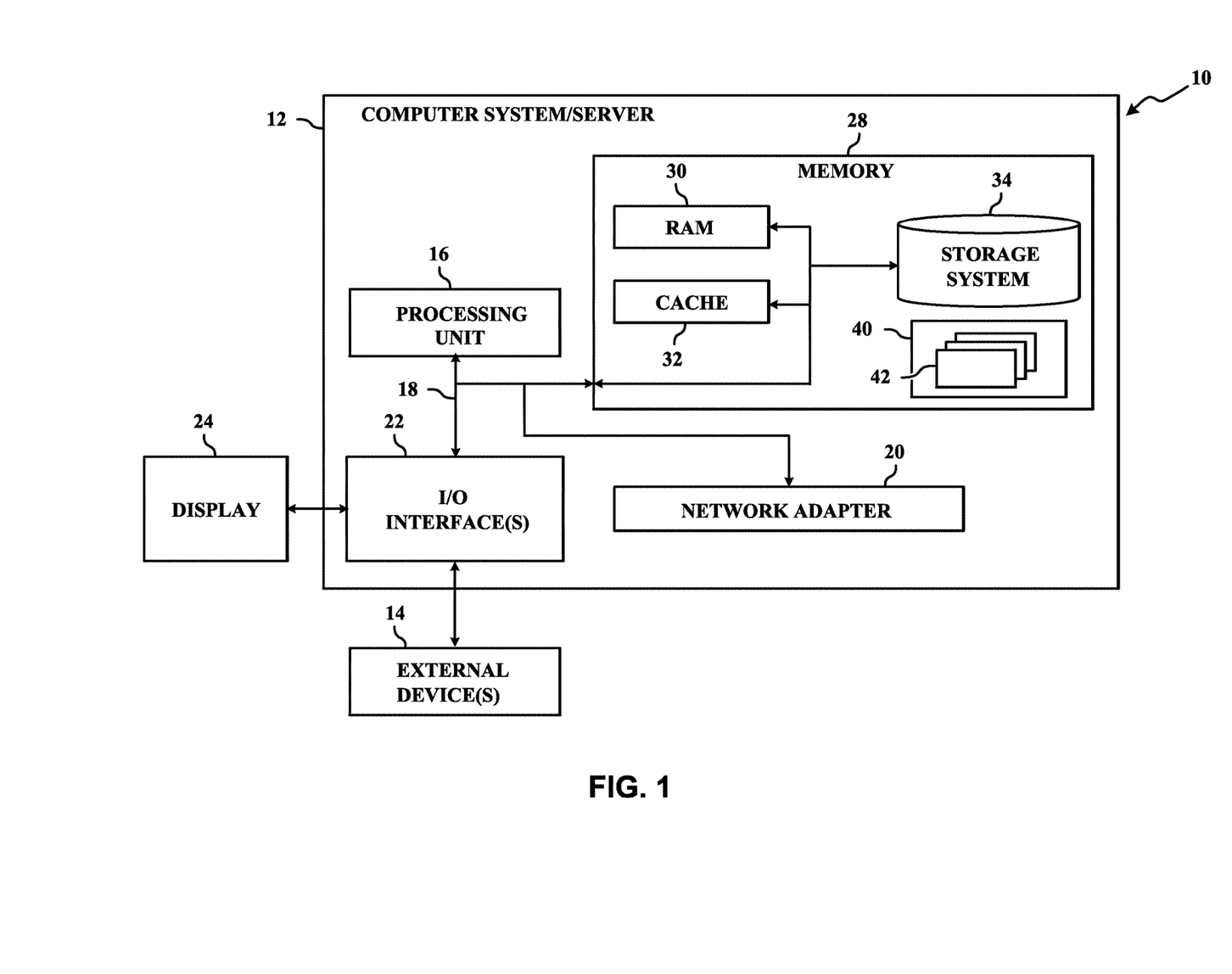
FIG. 1 shows an computer system/server which is applicable to implement the embodiments of the present disclosure.

Referring now to FIG. 1, in which a computer system/server 12 which is applicable to implement the embodiments of the present disclosure is shown. Computer system/server 12 is only illustrative and is not intended to suggest any limitation as to the scope of use or functionality of embodiments of the disclosure described herein.

As shown in FIG. 1, computer system/server 12 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the disclosure.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the disclosure as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Now with reference to the drawings, the embodiments of the present disclosure will be described in detail.

Figure 2:
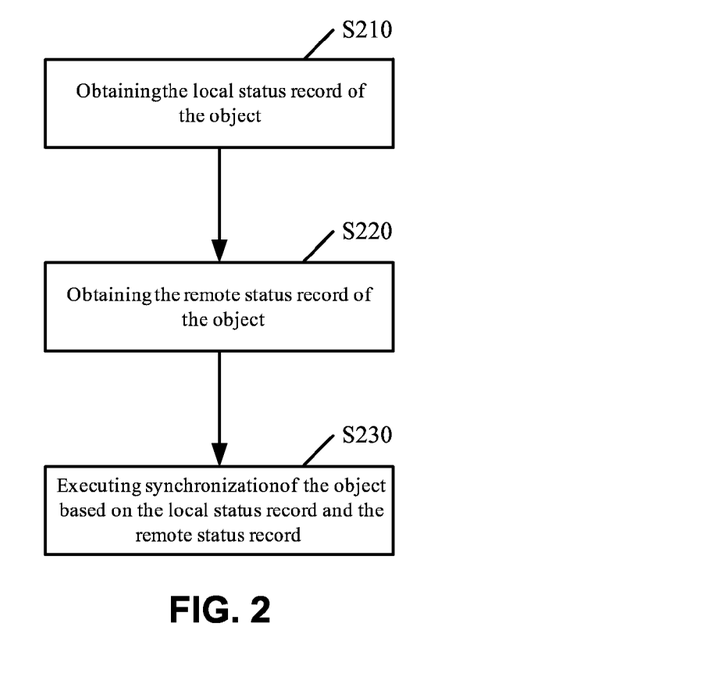
FIG. 2 is a flow chart of the method for synchronizing an object in a local object storage node according to an embodiment of the present disclosure.

FIG. 2 shows the flow chart of the method for synchronizing an object in a local object storage node according to an embodiment of the present disclosure. Hereafter, the embodiment will be described in detail in conjunction with the accompanying drawing.

The basic idea of this embodiment is to utilize the status records of the same object stored in the memory of the respective object storage nodes in the distributed object storage system to check the discrepancies among the multiple replicas of the object and to further repair the discrepancies.

In this embodiment, the local object storage node can be one of a plurality of object storage nodes in the distributed object storage system, and accordingly, other object storage nodes except the local object storage node in the plurality of object storage nodes can be referred to as the remote object storage nodes. In addition, the same object can be stored on the local object storage node and at least one remote object storage node.

The status record of the object is an entry for recording information relating to an operation which changes the object, which is generated every time when the operation happens, and can be stored in the memory of the object storage node where the object is stored. The operation which changes the object can include, for example, creating the object, deleting the object and other operations affecting disk of the object storage node. The status record of the object can include a name of the object, a name of the operation, a timestamp of the operation and a synchronization status of the object. It should be noted that in this embodiment each timestamp only corresponds to one operation for one object, that is to say, for the same object, there is only one operation for one timestamp.

The synchronization status of the object can be used for indicating whether the synchronization of the object from current object storage node to another object storage node is executed, and whether the synchronization of the object from another object storage node to the current object storage node is executed. In this embodiment, a status flag can be used to indicate a synchronization status. Specifically, the synchronization status can include a first status flag and a second status flag. The first status flag indicates whether the synchronization of the object from the current object storage node to another object storage node is executed, and the second status flag indicates whether the synchronization of the object from the another object storage node to the current object storage node is executed. The first status flag and the second status flag can be represented by binary values, e.g., "0" (indicating that the synchronization is not executed) and "1" (indicating that the synchronization is executed), or "true" (indicating that the synchronization is executed) and "false" (indicating that the synchronization is not executed), etc.

At least one object can be stored in each object storage node. For each object, at least one status record can be generated. Thus, in each object storage node, at least one status record of at least one object can be stored.

In the case that the current object storage node has one object, there can be one or more other corresponding object storage nodes. In the case of one other object storage node, the synchronization status in the status record of the current object storage node would include a single first status flag to indicate whether the synchronization of the object from the current object storage node to the other object storage node is executed, and a single second status flag to indicate whether the synchronization of the object from the other object storage node to the current object storage node is executed. In the case of a plurality of other object storage nodes, the synchronization status in the status record of the current object storage node would include a plurality of first status flags to respectively indicate whether the synchronization of the object from the current object storage node to each of the plurality of other object storage nodes is executed, and a plurality of second status flags to respectively indicate whether the synchronization of the object from each of the plurality of other object storage nodes to the current object storage node is executed.

In the case that the current object storage node has a plurality of objects, for each object, there can be one or more other corresponding object storage nodes. Thus, in the case that there is one other object storage node for a certain object, the synchronization status in the status record regarding the object of the current object storage node would include a single first status flag to indicate whether the synchronization of the object from the current object storage node to the other object storage node is executed, and a single second status flag to indicate whether the synchronization of the object from the other object storage node to the current object storage node is executed. In the case of a plurality of other object storage nodes, the synchronization status in the status record regarding the object of the current object storage node would include a plurality of first status flags to respectively indicate whether the synchronization of the object from the current object storage node to each of the plurality of other object storage nodes is executed, and include a plurality of second status flags to respectively indicate whether the synchronization of the object from each of the plurality of other object storage nodes to the current object storage node is executed.

In the following embodiment, for convenience of illustration, the method according to this embodiment is described in the case that the same one object is stored on the local object storage node and one remote object storage node.

As shown in FIG. 2, in step S210, the latest status record of the object in the local object storage node is obtained as a local status record of the object. As described above, the status record of the object stores the information about the operations changing the object. For the local object storage node, the current object storage node is the local object storage node, and the other object storage node is the remote object storage node. Therefore, the first status flag of the synchronization status in the status record of the object indicates whether the synchronization of the object from the local object storage node to the remote object storage node (hereinafter referred to as "local to remote synchronization") is executed, and the second status flag indicates whether the synchronization of the object from the remote object storage node to the local object storage node (hereinafter referred to as "remote to local synchronization") is executed. When an operation changing the object, for example, creating the object, deleting the object, etc. occurs, the status record corresponding to the operation will be generated. In the generated status record, the name of the object, the name of the operation, and the timestamp of the operation are recorded, and both the first status flag and the second status flag of the synchronization status are set to indicate that the synchronization is not executed. It is assumed that the first status flag is represented as L→R, and the second status flag is represented as R→L, where L denotes the local object storage node, R denotes the remote object storage node, then in the local object storage node, the synchronization status in the status record of the object may be represented as L(L→R, R→L)=(0, 0).

Since the status record is generated for each operation changing the object, the current status of the object can be reflected by the latest status record. Thus, in order to check whether there are inconsistencies among a plurality of replicas (there are two replicas in this embodiment) of the object, only the latest status record of the object in the local object storage node and the latest status record thereof in the remote object storage node can be taken into account.

The status record may be used to detect inconsistencies between the replicas of the same object stored in a plurality of object storage nodes in the distributed object storage system, and repair the detected inconsistencies without generating high disk I/O overhead.

In this step, the latest status record can be determined according to the timestamp in the status record. In one embodiment, in response to starting the synchronization of the object, at least one status record with the timestamp of the object earlier than a start time is selected. The synchronization of the object can be executed periodically or triggered by a specific operation. Thus, the start time can be readily determined. Then, the status record with the maximum timestamp in the selected at least one status record is determined as the latest status record. Further, the remaining status records in the at least one status record may be deleted from the memory. Thus, the latest status record becomes the local status record of the object.

In another embodiment, in response to starting the synchronization of the object, at least one status record with the timestamp of the object earlier than the time which equals to the start time minus a predetermined time may be selected. Thus, it avoids processing the object being operated. The predetermined time can be, for example, 60 seconds. Then, the status record with the maximum timestamp is determined as the latest status record. Then, the remaining status records in the at least one status record may be deleted from the memory.

The local status record of the object obtained by step S210 can reflect the latest status of the object before starting the synchronization of the object.

Next, in step S220, the latest status record of the object in the remote object storage node is obtained as the remote status record of the object. As described above, the status record of the object is stored in each object storage node storing the same object. Thus, every time when the operation relating to the object occurs, the remote object storage node which stores the same object as the local object storage node will also generate the status record of the object. In the remote object storage node, the synchronization status in the status record of the object may be represented as R (R→L, L→R).

In the step S220, firstly a request is sent to the remote object storage node, the request including the name of the object and the start time. In response to the received request, the remote object storage node may use the method similar to the method for obtaining the latest status record in step S210 to obtain the latest status record of the object in the remote object storage node. Specifically, the remote object storage node may obtain, based on the name of the object and the start time, at least one status record with the timestamp of the object earlier than the start time or the time which equals to the start time minus the predetermined time from the stored status record of the object. Then, the remote object storage node determines the status record with the maximum timestamp as the latest status record of the object in the remote object storage node, and deletes the remaining status records in the at least one status record. Then the remote object storage node sends the determined latest status record to the local object storage node as the remote status record of the object. Accordingly, the local object storage node receives the remote status record of the object from the remote object storage node.

Although it is described above to obtain the local status record and the remote status record of the object in the order of steps S210 and S220, those skilled in the art can appreciate that there is no order for steps S210 and S220, which may be further executed in a reverse order or concurrently.

Then, in step S230, the synchronization of the object is executed in the local object storage node based on the local status record of the object obtained in step S210 and the remote status record of the object obtained in step S220. In this embodiment, only the local to remote synchronization can be executed in the local object storage node, and the remote to local synchronization cannot be executed. The remote to local synchronization of the object is executed in the remote object storage node. In the local object storage node, the operation on the object in the local status record can be replicated to the remote object storage node which has no remote status record or whose remote status record is older than the local status record.

Figure 3:
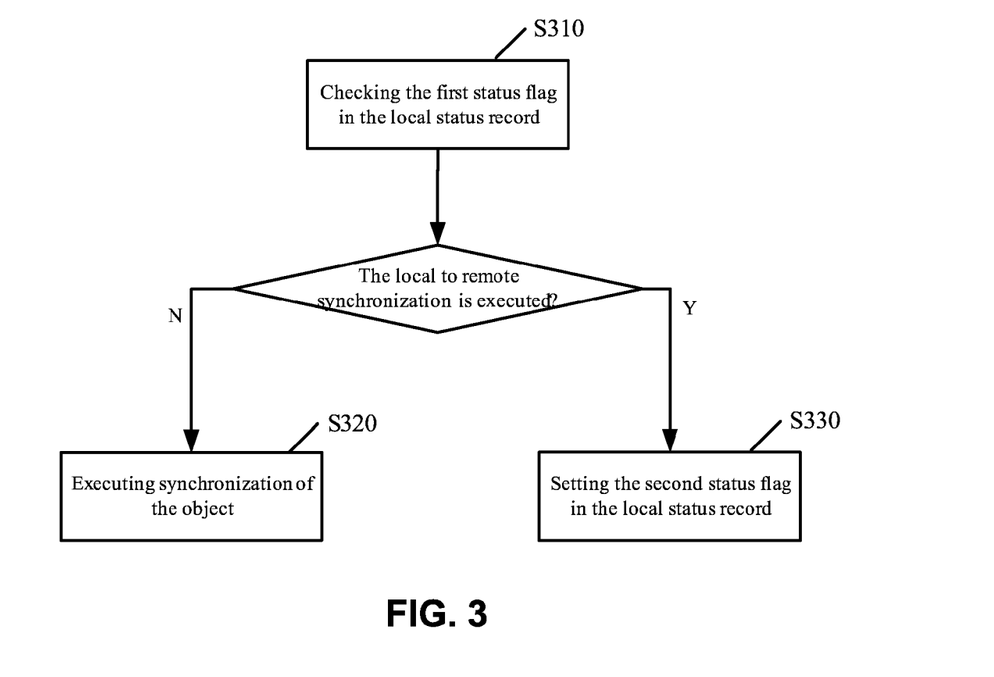
FIG. 3 is a schematic flow chart of the process for executing synchronization of an object according to the embodiment shown in FIG. 2.

FIG. 3 shows the schematic flow chart of the process (step S230) for executing the synchronization of the object according to the embodiment. As shown in FIG. 3, in step S310, the first status flag L (L→R) in the local status record is checked. If it is checked that the first status flag in the local status record indicates that the local to remote synchronization is not executed, e.g., the first status flag is "0" or "false", in step S320, the local to remote synchronization of the object is executed. If it is checked that the first status flag in the local status record indicates that the local to remote synchronization is executed, e.g., the first status flag is "1" or "true", in step S330, the second status flag in the local status record is set to be same as the first status flag in the remote status record. At this point, the synchronization status in the local status record may be represented as L (L→R, R→L)=(1, R (R→L)). Or, if the remote status record of the object is not obtained by step S220, in step S330, the second status flag in the local status record may be set to indicate that the remote to local synchronization is executed. In this case, the synchronization status in the local status record may be represented as L (L→R, R→L)=(1, 1).

Figure 4:
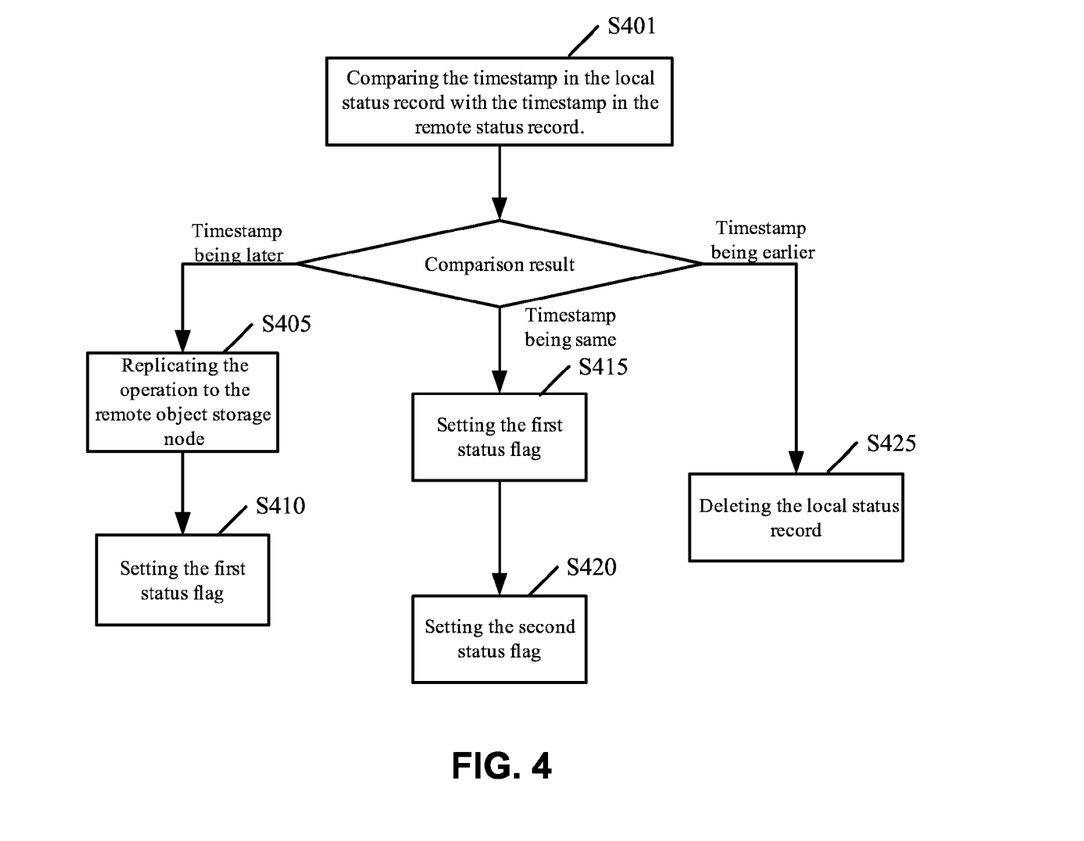
FIG. 4 is a schematic flow chart illustrating the process for executing synchronization of an object when a remote status record of the object is obtained.
Figure 5:
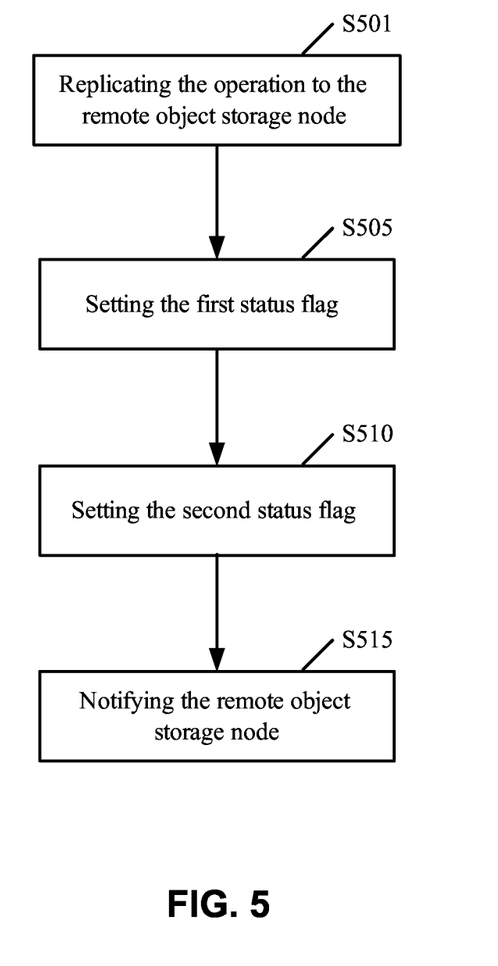
FIG. 5 is a schematic flow chart illustrating a process for executing synchronization of an object when a remote status record of the object is not obtained.

In this embodiment, the process of the local to remote synchronization of the object can be divided into two sub-processes according to whether the remote status record of the object is obtained, respectively shown in FIG. 4 and FIG. 5.

FIG. 4 shows the schematic flow chart illustrating the process for executing the local to remote synchronization (a first sub-process) of the object when the remote status record of the object is obtained by step S220. As shown in FIG. 4, in step S401, in response to that the remote status record is obtained (i.e., the remote object storage node generates and stores the status record of the object), the timestamp in the local status record is compared with the timestamp in the remote status record. As described above, the timestamp indicates the time when the operation changing the object occurs, and therefore it can be determined whether the operations on the object in the local object storage node and in the remote object storage node are consistent before the start time by comparing the timestamps. Next, in response the comparison result, the corresponding synchronization process of the object is executed.

If the comparison result is that the timestamp in the local status record is later than the timestamp in the remote status record, which indicates that the local status record is newer than the remote status record, in step S405, the operation recorded in the local status record is replicated to the remote object storage node, so that the operation can be executed in the remote object storage node. Then in step S410, the first status flag in the local status record can be set to indicate that the local to remote synchronization is executed. The first status flag can be represented as L→R=1. In this case, the second status flag in the local status record may remain unchanged.

Moreover, after the operation is replicated to the remote object storage node, in addition to the first status flag in the local status record, the second status flag in the local status record is set to indicate that the remote to local synchronization is executed, and the remote object storage node is notified that the object is replicated. At this point, the synchronization status in the local status record can be represented as L (L→R, R→L)=(1, 1). Thus, the remote object storage node can, according to the notification, directly set the first status flag and the second status flag in the remote status record respectively to indicate that the remote to local synchronization is executed and to indicate that the local to remote synchronization is executed.

If the comparison result is that the timestamp in the local status record is same as the timestamp in the remote status record, i.e., the local status record is same as the remote status record, in step S415, the first status flag in the local status record is set to indicate that the local to remote synchronization is executed, and in step S420, the second status flag in the local status record is set to be same as the first status flag in the remote status record. At this point, the synchronization status in the local status record can be represented as L (L→R, R→L)=(1, R (R→L)).

If the comparison result is that the timestamp in the local status record is earlier than the timestamp in the remote status record, which indicates that the local status record is older than the remote status record, in step S425, the local status record is deleted.

It can be seen from the above-described synchronization process that the local object storage node can only set or modify the synchronization status in its own local status record, but cannot set or modify the synchronization status in the status record in the remote object storage node.

FIG. 5 shows the schematic flow chart illustrating the process for executing synchronization of the object (a second sub-process) when the remote status record of the object is not obtained by step S220.

As shown in FIG. 5, in step S501, in response to that the remote status record of the object is not obtained (i.e., the remote object storage node does not generate/store the status record of the object), the operation of the object recorded in the local status record is replicated from the local object storage node to the remote object storage node, so that the operation can be executed in the remote object storage node. Then, in step S505, the first status flag in the local status record is set to indicate that the local to remote synchronization is executed, and in step S510, the second status flag in the local status record is set to indicate that the remote to local synchronization is executed. At this point, the synchronization status in the local status record can be represented as L (L→R, R→L)=(1, 1). Then, in step S515, the remote object storage node is notified that the object is replicated. The remote object storage node can, according to the notification, directly set the first status flag and the second status flag in the remote status record respectively to indicate that the remote to local synchronization is executed and to indicate that the local to remote synchronization is executed.

Further, during the synchronization of the object is executed, if the first status flag in the local status record is set to indicate that the local to remote synchronization is executed and the second status flag is set to indicate that the remote to local synchronization is executed, i.e., L (L→R, R→L)=(1, 1), it indicates that the synchronization of the object has been completed, and then the local status record is deleted.

In addition, during the synchronization of the object is executed, the second status flag in the local status record may also be checked. If the second status flag indicates that the remote to local synchronization is executed, it shows that the synchronization of the object has been completed, and it is not necessary to execute any synchronization operation. Accordingly, the local status record is deleted.

Therefore, it can be seen that the local status record of the object on which the local to remote synchronization and remote to local synchronization have been executed are deleted from the memory, and only the status records of the object on which the synchronization process is not executed will be retained in the memory.

Although the method of this embodiment is described above in the case that the same object is stored on the local object storage node and one remote object storage node, the method of this embodiment is also applicable to the cases where the same object is stored on the local object storage node and a plurality of remote object storage nodes, where a plurality of the same objects is stored on the local object storage node and one remote object storage node, and where a plurality of the same objects is stored on the local object storage node and a plurality of remote object storage nodes.

In the case where the same object is stored on the local object storage node and a plurality of remote object storage nodes, the synchronization status in the local status record can be represented as L (L→$R_1$, $R_1$→L, L→$R_2$, $R_2$→L, ..., L→$R_n$, $R_n$→L), and the synchronization status in the remote status record of each remote object storage node $R_i$ is represented as $R_i$ ($R_i$→L, L→$R_i$, ..., $R_i$→$R_m$, $R_m$→$R_i$, ...). For each remote object storage node, the method of this embodiment is executed in the local object storage node.

In the case where a plurality of same objects is stored on the local object storage node and one remote object storage node, for each of the same objects, there are the local status record and the remote status record. The synchronization status in the local status record and the remote status record of each object can use the same representation as that for the case where the same object is stored on the local object storage node and one remote object storage node. For each of the same objects, the method of this embodiment is executed in the local object storage node.

In the case where a plurality of same objects is stored on the local object storage node and a plurality of remote object storage nodes, for each of the same objects, the synchronization status in the local status record is represented as L (L→$R_1$, $R_1$→L, L→$R_2$, $R_2$→L, ..., L→$R_n$, $R_n$→L), and the synchronization status in the remote status record of each remote object storage node $R_i$ is represented as $R_i$ ($R_i$→L, L→$R_i$, ..., $R_i$→$R_m$, $R_m$→$R_i$, ...). For each of the same objects and for each remote object storage node, the method of this embodiment is executed in the local object storage node.

In the distributed object storage system including a plurality of object storage nodes, during the synchronization of the object is executed, it is necessary to execute the method of this embodiment in each object storage node. In this case, each object storage node can be considered as a local object storage node.

It can be seen from the above description that the method for synchronizing the object in the local object storage node according to this embodiment can utilize the local status record of the object from the local object storage node and the remote status record of the object from the remote object storage node to quickly detect the consistencies of the object on the different object storage nodes, and since there is no need to read the object from the disk of the object storage node, the high disk I/O overhead will not be generated.

Hereinafter the method for synchronizing the object in the local object storage node according to the above-described embodiment will be illustrated again by a specific example.

It is assumed that the distributed object storage system includes three object storage nodes A, B and C, and all the three object storage nodes store the same object Name0. In order to implement the synchronization of the object Name0 in the three object storage nodes A, B and C, the object storage nodes A, B and C, as the local object storage node, will execute the method for synchronizing the object in the local object storage node according to the above-described embodiment.

In the object storage node A, firstly the latest status record of the object Name0 in the object storage node A is obtained as the local status record. In this example, the local status record is represented as (Name0, "Create", TS0, (A→B, B→A, A→C, C→A)), and A→B=0, B→A=0, A→C=0, C→A=0.

Next, the latest status record of the object Name0 in the object storage node B is obtained as the remote status record. In this example, the remote status record from the object storage node B is represented as (Name0, "Create", TS0, (B→A, A→B, B→C, C→B)), and B→A=0, A→B=0, B→C=0, C→B=0.

As the first status flag in the local status record A→B=0, the synchronization of the object Name0 from the object storage node A to the object storage node B will be executed. The timestamp in the local status record is compared with the timestamp in the remote status record. In this example, the timestamp in the local status record is same as the timestamp in the remote status record, so in the local status record, A→B is set to 1, and B→A is set to be identical with B→A in the remote status record, i.e., 0.

In the object storage node A, the latest status record of the object Name0 in the object storage node C is also obtained. However, the object storage node C does not have the status record of the object Name0, so the object storage node A cannot obtain the remote status record from the object storage node C. In this case, the operation "Create" recorded in the local status record is replicated to the object storage node C, and in the local status record, A→C is set to 1, and C→A is also set to 1. In addition, the object storage node C is also notified that the object Name0 is replicated from the object storage node A. In the object storage node C, the status record of the object Name0 is generated, which can be represented as (Name0, "Create", TS0, (C→A, A→C, C→B, B→C)), and C→A=1, A→C=1, C→B=0, B→C=0.

Through the above operations, the synchronization of the object Name0 from the object storage node A to the object storage nodes B and C respectively is executed in the object storage node A. At this point, in the local status record of the object storage node A, A→B=1, B→A=0, A→C=1, C→A=1.

In the object storage node B, firstly the latest status record of the object Name0 in the object storage node B is obtained as the local status record. At this point, in the local status record of the object storage node B, B→A=0, A→B=0, B→C=0, C→B=0.

Next, the latest status record of the object Name0 in the object storage node A is obtained as the remote status record. At this point, in the remote status record from the object storage node A, A→B=1, B→A=0, A→C=1, C→A=1.

As in the local status record B→A=0, the synchronization of the object Name0 from the object storage node B to the object storage node A will be executed. The timestamp in the local status record is compared with the timestamp in the remote status record. In this example, the timestamp in the local status record is same as the timestamp in the remote status record, so in the local status record of the object storage node B, B→A is set to 1, and A→B is set to be same as A→B in the remote status record, i.e., 1.

In the object storage node B, the latest status record of the object Name0 in the object storage node C is also obtained. At this point, in the remote status record from the object storage node C, C→A=1, A→C=1, C→B=0, B→C=0.

As in the local status record B→C=0, the synchronization of the object Name0 from the object storage node B to the object storage node C will be executed. The timestamp in the local status record is compared with the timestamp in the remote status record. In this example, the timestamp in the local status record is same as the timestamp in the remote status record, so in the local status record of the object storage node B, B→C is set to 1, and C→B is set to be same as C→B in the remote status record, i.e., 0.

Through the above operations, the synchronization of the object Name0 from the object storage node B to the object storage nodes A and C respectively is executed in the object storage node B. At this point, in the local status record of the object storage node B, B→A=1, A→B=1, B→C=1, C→B=0.

In the object storage node C, firstly the latest status record of the object Name0 in the object storage node C is obtained as the local status record. At this point, in the local status record in the object storage node C, C→A=1, A→C=1, C→B=0, B→C=0. As C→A=1 and A→C=1, which indicates the synchronization of the object Name0 from the object storage node C to the object storage node A and the synchronization from the object storage node A to the object storage node C have been executed, so the object storage node A can be ignored.

Then, the latest status record of the object Name0 in the object storage node B is obtained. At this point, in the remote status record from the object storage node B, B→A=1, A→B=1, B→C=1, C→B=0.

As in the local status record C→B=0, the synchronization of the object Name0 from the object storage node C to the object storage node B will be executed. The timestamp in the local status record is compared with the timestamp in the remote status record. In this example, the timestamp in the local status record is same as the timestamp in the remote status record, so in the local status record of the object storage node C, C→B is set to 1, and B→C is set to be same as B→C in the remote status record, i.e., 1.

Through the above operations, the synchronization of the object Name0 from the object storage node C to the object storage node B is executed in the object storage node C. At this point, in the local status record of the object storage node C, C→A=1, A→C=1, C→B=1, B→C=1. As the synchronization status in the local status record of the object storage node C has been set to 1, so the status record is deleted.

When the object storage node A restarts the synchronization of the object Name0, the local status record of the object Name0 is obtained again. At this point, in the local status record, A→B=1, B→A=0, A→C=1, C→A=1. As A→C=1 and C→A=1, i.e., the synchronization of the object Name0 from the object storage node A to the object storage node C and the synchronization from the object storage node C to the object storage node A have been executed, there is no need to obtain the remote status record from the object storage node C, and no operation is executed. The remote status record from the object storage node B is obtained. In the remote status record, B→A=1, A→B=1, B→C=1, C→B=0. As in the local status record, A→B=1, B→A therein is set to be same as B→A in the remote status record, i.e., 1. At this point, since the synchronization status in the local status record of the object storage node A has been set to 1, the status record is deleted.

When the object storage node B restarts the synchronization of the object Name0, the local status record of the object Name0 is obtained again. At this point, in the local status record, B→A=1, A→B=1, B→C=1, C→B=0. Since B→A=1 and A→B=1, i.e., the synchronization of the object Name0 from the object storage node B to the object storage node A and the synchronization from the object storage node A to the object storage node B have been executed, there is no need to obtain the remote status record from the object storage node A, and no operation is executed. The remote status record from the object storage node C is obtained. At this point, in the object storage node C, the status record of the object Name0 has been deleted. Since B→C=1, i.e., the synchronization of the object Name0 from the object storage node B to the object storage node C has been executed, C→B in the local status record is set to 1. At this point, since the synchronization status in the local status record of the object storage node B has been set to 1, the status record is deleted.

Thus, by means of the above process, the synchronization of the object Name0 among the object storage nodes A, B and C can be completed.

Figure 6:
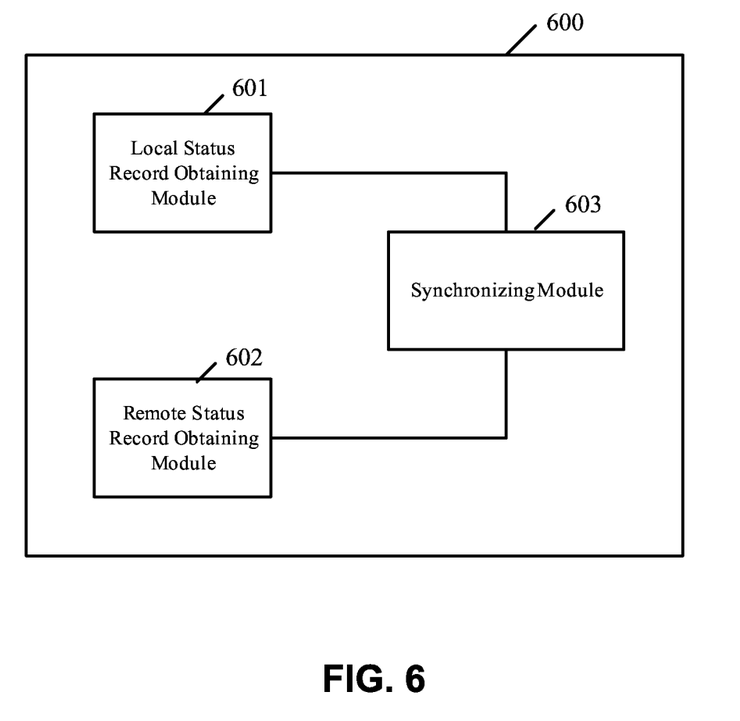
FIG. 6 is a schematic block diagram of an apparatus for synchronizing an object in a local object storage node according to an embodiment of the present disclosure.

Under the same inventive concept, FIG. 6 is the schematic block diagram of the apparatus 600 for synchronizing an object in a local object storage node according to an embodiment of the present disclosure. Hereinafter, this embodiment will be described in detail in conjunction with the accompanying drawing, wherein for the same parts as those of the previous embodiments, the description thereof will be omitted properly.

As shown in FIG. 6, the apparatus 600 for synchronizing the object in the local object storage node according to the embodiment of the present disclosure comprises: a local status record obtaining module 601 which is configured to obtain the latest status record of the object in the local object storage node as a local status record of the object; a remote status record obtaining module 602 which is configured to obtain the latest status record of the object from the remote object storage node as a remote status record of the object; and a synchronizing module 603 which is configured to execute synchronization of the object based on the local status record and the remote status record obtained.

The description about the status records has been provided in detail in the previous embodiments, and will not be repeated here.

Further, the apparatus 600 according to the this embodiment can comprise: a status record generating module which is configured to generate the status record of the object whenever the operation changing the object occurs; and a status setting module which is configured to set the first status flag in the generated status record to indicate that the local to remote synchronization is not executed, and set the second status flag in the generated status record to indicate that the remote to local synchronization is not executed.

According to one embodiment, in the local status record obtaining module 601, a selecting unit selects at least one status record with the timestamp of the object earlier than a start time, in response to starting the synchronization of the object. Next, a determining unit determines the status record with the maximum timestamp in the selected at least one status record as the latest status record. Then, a deleting unit deletes the remaining status records in the selected at least one status record.

Further, the selecting unit may be configured to select at least one status record with the timestamp of the selected object earlier than the time which equals to the start time minus the predetermined time.

According to one embodiment, in the remote status record obtaining module 602, a requesting unit sends a request including the name of the object and the start time to the remote object storage node, and a receiving unit receives the latest status record of the object from the remote object storage node, as the remote status record.

According to one embodiment, in the synchronizing module 603, a checking sub-module checks the first status flag in the local status record. Then, if the checking sub-module checks that the first status flag in the local status record indicates that the local to remote synchronization of the object is not executed, a synchronizing sub-module executes the local to remote synchronization of the object. If the checking sub-module checks that the first status flag in the local status record indicates that the local to remote synchronization of the object is executed, a status setting sub-module sets the second status flag in the local status record to be same as the first status flag in the remote status record, or set the second status flag in the local status record to indicate that the remote to local synchronization of the object is executed in the case that the remote status record is not obtained.

In the synchronizing sub-module, a comparing unit compares the timestamp in the local status record with the timestamp in the remote status record. If the comparison result is that the timestamp in the local status record is later than the timestamp in the remote status record, a replicating unit replicates the operation recorded in the local status record to the remote object storage node, and after the replicating unit replicates the operation recorded in the local status record to the remote object storage node, the status setting sub-module sets the first status flag in the local status record to indicate that the local to remote synchronization is executed. If the comparison result is that the timestamp in the local status record is same as the timestamp in the remote status record, the status setting sub-module sets the first status flag in the local status record to indicate that the local to remote synchronization is executed, and sets the second status flag in the local status record to be same as the first status flag in the remote status record. If the comparison result is that the timestamp in the local status record is earlier than the timestamp in the remote status record, the deleting unit deletes the local status record.

Further, after the replicating unit replicates the operation to the remote object storage node, the status setting sub-module can set the second status flag of the synchronization status in the local status record to indicate that the remote to local synchronization is executed. Then a notifying unit in the synchronizing sub-module notifies the remote object storage node that the object is replicated If the remote status record is not obtained, in the synchronizing sub-module, the replicating unit replicates the operation recorded in the local status record from the local object storage node to the remote object storage node. Then, the status setting sub-module sets the first status flag in the local status record to indicate that the local to remote synchronization is executed, and sets the second status flag in the local status record to indicate that the remote to local synchronization is executed. The notifying unit notifies the remote object storage node that the object is replicated In the synchronizing module 603, if the first status flag of the synchronization status in the local status record is set to indicate that the local to remote synchronization is executed, and the second status flag is set to indicate that the remote to local synchronization is executed, a deleting sub-module can delete the local status record.

Those skilled in the art will appreciate that the deleting unit in the synchronizing sub-module and the deleting sub-module in the synchronizing module 603 can be implemented as one component.

It should be noted that, the apparatus 600 according to this embodiment can implement the method for synchronizing the object in the local object storage node according to the embodiments shown in FIG. 2 to FIG. 5.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer method comprising:
  synchronizing an object in a local object storage node, wherein a same object is stored on the local object storage node and a remote object storage node by:
    obtaining a first latest status record of an object in a local object storage node as a local status record of the object, wherein the local status record is generated when an operation changing the object is performed and includes a name of the operation changing the object, a timestamp of the operation changing the object, a first status flag and a second status flag that are each configured to indicate a directionality of an execution of a synchronization such that the first status flag indicates whether a synchronization of the object from the local object storage node to a remote object storage node is executed and the second status flag indicates whether a synchronization of the object from the remote object storage node to the local object storage node is executed;
    checking the first status flag in the local status record;
    determining that the first status flag in the local status record indicates that the synchronization of the object from the local object storage node to the remote object storage node is not executed;
    obtaining, in response to determining that the first status flag in the local status record indicates that the synchronization of the object from the local object storage node to the remote object storage node is not executed, a second latest status record of the object in the remote object storage node, the second latest status record being a remote status record of the object that includes a timestamp in the remote status record of the object changing in the remote object storage node;

executing synchronization of the object based on the local status record;

changing, in response to executing synchronization of the object based on the local status record, the first status flag to indicate that synchronization of the object from the local object storage node to the remote object storage node is executed;

executing synchronization of the object based on the remote status record; and changing, in response to executing synchronization of the object based on the remote status record, the second status flag to indicate that synchronization of the object from the remote object storage node to the local object storage node is executed, wherein the executing of the synchronization of the object based on the local status record and the remote status record includes:

comparing the timestamp in the local status record with the timestamp in the remote status record;

in response to determining that the timestamp in the local status record is later than the timestamp in the remote status record, replicating the operation to the remote object storage node and setting the first status flag in the local status record to indicate that the synchronization of the object from the local object storage node to the remote object storage node is executed;

in response to determining that the timestamp in the local status record is same as the timestamp in the remote status record, setting the first status flag in the local status record to indicate that the synchronization of the object from the local object storage node to the remote object storage node is executed and setting the second status flag in the local status record to be same as the first status flag in the remote status record; and in response to determining that the timestamp in the local status record is earlier than the timestamp in the remote status record, deleting the local status record.

2. The method according to claim 1, further comprising:

generating, in response to the operation changing the object, a generated status record of the object;

setting the first status flag in the generated status record to indicate that the synchronization of the object from the local object storage node to the remote object storage node is not executed; and setting the second status flag in the generated status record to indicate that the synchronization of the object from the remote object storage node to the local object storage node is not executed.

3. The method according to claim 1, wherein the obtaining of the latest status record of the object in the local object storage node includes:

selecting, in response to starting the synchronization of the object, at least one status record with the timestamp of the object that is earlier than a start time; and determining a status record with a maximum timestamp in the at least one status record as a latest status record.

4. The method according to claim 3, wherein, the selecting of at least one status record with the timestamp of the object that is earlier than a start time includes:

selecting at least one status record with the timestamp of the object earlier than a time which equals to the start time minus a predetermined time.

5. The method according to claim 4, wherein the selecting of the at least one status record with the timestamp of the object earlier than the time in the local object storage node further includes:

deleting one or more remaining status records except the latest status record of the at least one status record.

6. The method according to claim 3, wherein the obtaining of the latest status record of the object in the remote object storage node, as a remote status record of the object includes:

sending a request to the remote object storage node, the request including a name of the object and the start time; and receiving the latest status record of the object from the remote object storage node.

7. The method according to claim 1, wherein the executing of the synchronization of the object based on the local status record and the remote status record includes:

setting the second status flag in the local status record to be identical to the first status flag in the remote status record, or setting the second status flag in the local status record to indicate that the execution of the synchronization of the object from the remote object storage node to the local object storage node is executed in a case that the remote status record is not obtained, based on checking that the first status flag in the local status record indicates that the synchronization of the object from the local object storage node to the remote object storage node is executed.

8. The method according to claim 7, wherein the executing of the synchronization of the object based on the local status record and the remote status record further includes:

deleting the local status record based on the first status flag of the synchronization of the object from the local object storage node to the remote object storage node being executed and the second status flag the synchronization of the object from the remote object storage node to the local object storage node being executed.

9. The method according to claim 1, wherein, after the operation is replicated to the remote object storage node, the second status flag in the local status record is set to indicate that the synchronization of the object from the remote object storage node to the local object storage node is executed, and to notify the remote object storage node that the object is replicated.

10. The method according to claim 1, wherein the executing of the synchronization of the object from the local object storage node to the remote object storage node further comprises:

replicating the operation from the local object storage node to the remote object storage node, if the remote status record is not obtained;

setting the first status flag in the local status record to indicate that the synchronization of the object from the local object storage node to the remote object storage node is executed;

setting the second status flag in the local status record to indicate that the synchronization of the object from the remote object storage node to the local object storage node is executed; and notifying the remote object storage node that the object is replicated.

11. An apparatus for synchronizing an object in a local object storage node, wherein a same object is stored on a local object storage node and a remote object storage node, the apparatus comprising:
- a local status record obtaining module configured to obtain a latest status record of an object in a local object storage node as a local status record of the object, the local status record being generated when an operation changing the object is executed and including a name of the operation changing the object, a timestamp of the operation changing the object, a first status flag and a second status flag that are each configured to indicate a directionality of an execution of a synchronization such that the first status flag indicates whether a synchronization of the object from the local object storage node to a remote object storage node is executed and the second status flag indicates whether a synchronization of the object from the remote object storage node to the local object storage node is executed;
- a checking sub-module configured to check the first status flag in the local status record;
- a synchronizing sub-module configured to determine that the first status flag in the local status record indicates that the synchronization of the object from the local object storage node to the remote object storage node is not executed;
- a remote status record obtaining module configured to obtain, in response to determining that the first status flag in the local status record indicates that the synchronization of the object from the local object storage node to the remote object storage node is not executed, a remote latest status record of the object in a remote object storage node that includes a timestamp in the remote status record of the object changing in the remote object storage node; and
- a synchronizing module configured to execute synchronization of the object based on the local status record and the remote status record, wherein the synchronizing sub-module includes:
  - a comparing unit configured to compare the timestamp in the local status record with the timestamp in the remote status record;
  - a replicating unit configured to replicate, in response to determining that the timestamp in the local status record is later than the timestamp in the remote status record, the operation to the remote object storage node and setting the first status flag in the local status record to indicate that the synchronization of the object from the local object storage node to the remote object storage node is executed;
  - a status setting sub module of the synchronizing module that is configured to set, in response to determining that the timestamp in the local status record is same as the timestamp in the remote status record, the first status flag in the local status record to indicate that the synchronization of the object from the local object storage node to the remote object storage node is executed and setting the second status flag in the local status record to be same as the first status flag in the remote status record; and
  - a deleting unit configured to delete, in response to determining that the timestamp in the local status record is earlier than the timestamp in the remote status record, the local status record.

12. The apparatus according to claim 11, further comprising:
- a status record generating module configured to generate a generated status record of the object in response to the operation changing the object;
- a status setting module configured to set the first status flag in the generated status record to indicate that the synchronization of the object from the local object storage node to the remote object storage node is not executed, and set the second status flag in the generated status record to indicate that the synchronization of the object from the remote object storage node to the local object storage node is not executed.

13. The apparatus according to claim 11, wherein the local status record obtaining module includes:
- a selecting unit configured to select, in response to starting the synchronization of the object, at least one status record with the timestamp of the object earlier than a start time; and
- a determining unit configured to determine a status record with a maximum timestamp in the at least one status record as the latest status record.

14. The apparatus according to claim 13, wherein the remote status record obtaining module includes:
- a requesting unit configured to send a request to the remote object storage node, the request including a name of the object and the start time; and
- a receiving unit configured to receive the latest status record of the object from the remote object storage node.

15. The apparatus according to claim 11, wherein the status setting sub-module is further configured to set the second status flag in the local status record to be same as the first status flag in the remote status record, or set the second status flag in the local status record to indicate that the synchronization of the object from the remote object storage node to the local object storage node is executed in a case that the remote status record is not obtained, based on checking that the first status flag in the local status record indicates that the synchronization of the object from the local object storage node to the remote object storage node is executed.

16. The apparatus according to claim 11, wherein the status setting sub-module is further configured to set, after the replicating unit replicates the operation to the remote object storage node, the second status flag in the local status record to indicate that the synchronization of the object from the remote object storage node to the local object storage node is executed;
the synchronizing sub-module further includes a notifying unit configured to notify the remote object storage node that the object is replicated.

17. The apparatus according to claim 16, wherein, in the case that the remote status record is not obtained, the replicating unit is further configured to replicate the operation from the local object storage node to the remote object storage node, and the status setting sub-module is further configured to set the first status flag in the local status record to indicate that the synchronization of the object from the local object storage node to the remote object storage node is executed, and set the second status flag in the local status record to indicate that the synchronization of the object from the remote object storage node to the local object storage node is executed; and
the synchronizing sub-module further includes a notifying unit configured to notify the remote object storage node that the object is replicated.

18. The apparatus according to claim 11, wherein the synchronizing module further includes:
 a deleting sub-module configured to delete the local status record, based on the first status flag in the local status record is set to indicate that the synchronization of the object from the local object storage node to the remote object storage node is executed and the second status flag in the local status record is set to indicate that the synchronization of the object from the remote object storage node to the local object storage node is executed.

* * * * *